United States Patent
Beyer et al.

(12)
(10) Patent No.: US 6,202,405 B1
(45) Date of Patent: Mar. 20, 2001

(54) WALL CONSTRUCTION FOR A COMBUSTION CHAMBER OR A NOZZLE OF A HIGH PERFORMANCE PROPULSION PLANT

(75) Inventors: Steffen Beyer; Dietmar Wiedmann, both of Munich (DE)

(73) Assignee: DaimlerChrysler AG, 70567 Stuttgart (DE)

( * ) Notice: Subject to any disclaimer, the term of this patent is extended or adjusted under 35 U.S.C. 154(b) by 0 days.

(21) Appl. No.: 09/232,957

(22) Filed: Jan. 19, 1999

(30) Foreign Application Priority Data

Jan. 16, 1998 (DE) ............................................. 198 01 407

(51) Int. Cl.⁷ .................................................... F02K 11/00
(52) U.S. Cl. ................................................................ 60/267
(58) Field of Search ...................... 60/266, 267; 431/353; 239/DIG. 19, 397.5, 127.1

(56) References Cited

U.S. PATENT DOCUMENTS 3,957,206 * 5/1976 Mason ..................................... 60/271
4,078,604 * 3/1978 Christl et al. ........................ 60/267 X
4,629,397 * 12/1986 Schweitzer ........................... 60/267 X
5,899,060 * 5/1999 Schmidt .................................... 60/267

FOREIGN PATENT DOCUMENTS

| 3535779 | 4/1987 | (DE) . |
| 4015204 | 10/1991 | (DE) . |
| 4115403 | 11/1992 | (DE) . |
| 4310821 | 10/1994 | (DE) . |
| 19602731 | * 7/1997 | (DE) . |

* cited by examiner

*Primary Examiner*—Charles G. Freay
*Assistant Examiner*—David J. Torrente
(74) *Attorney, Agent, or Firm*—W. F. Fasse; W. G. Fasse

(57) ABSTRACT

A combustion chamber wall structure for a high performance propulsion plant or a wall structure for a nozzle of flying bodies has an outer pressure jacket and an inner wall member provided with a multitude of cooling channels. In operation the inner wall is in contact with hot gases. An intermediate layer made of a material having shape memory characteristics and/or superelastic characteristics is arranged between the inner wall member and the outer pressure jacket.

7 Claims, 1 Drawing Sheet

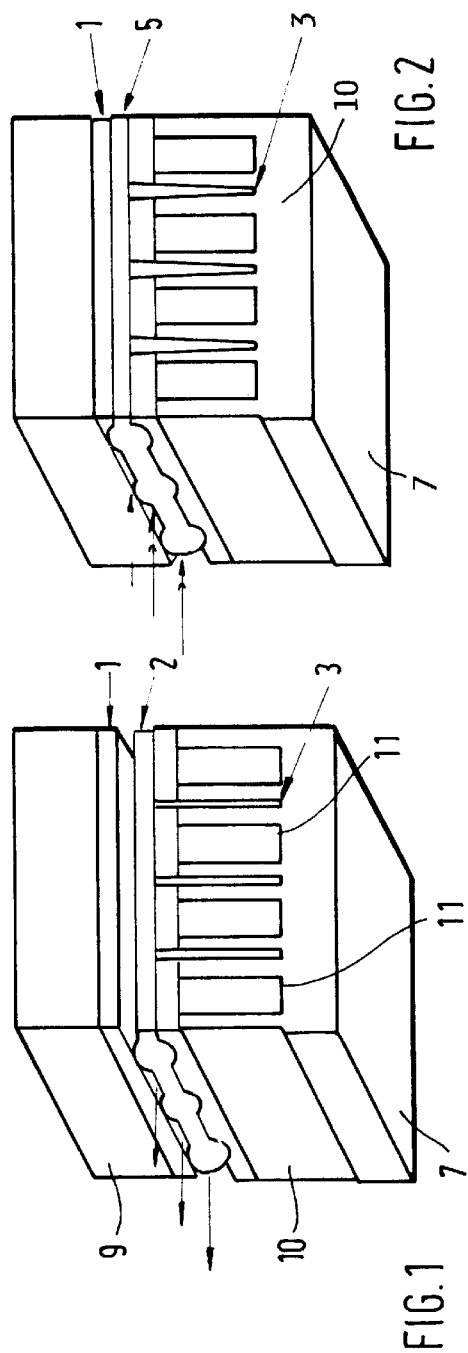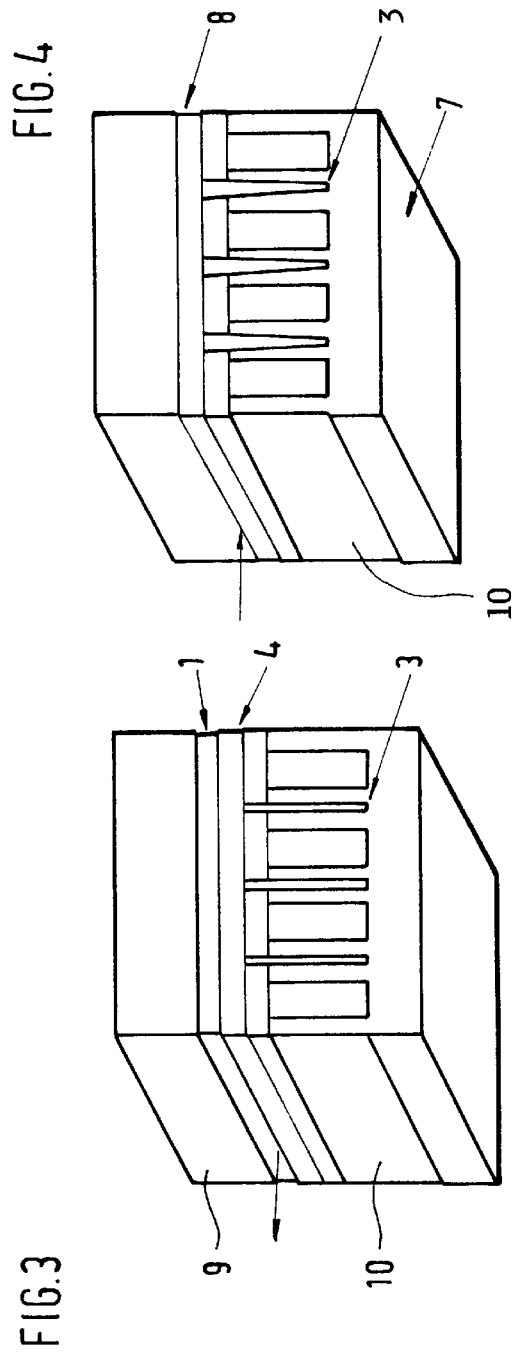

WALL CONSTRUCTION FOR A COMBUSTION CHAMBER OR A NOZZLE OF A HIGH PERFORMANCE PROPULSION PLANT

PRIORITY CLAIM

This application is based on and claims the priority under 35 U.S.C. §119 of German Patent Application 198 01 407.4, filed on Jan. 16, 1998, the entire disclosure of which is incorporated herein by reference.

FIELD OF THE INVENTION

The invention relates to a wall construction for a combustion chamber of high performance propulsion plants or for nozzles in such propulsion plants of flying bodies, particularly rockets.

BACKGROUND INFORMATION

The combustion chamber wall structure or nozzle wall structure is made of an outer pressure jacket and an inner wall member that in operation is in contact with the combustion hot gases. The inner wall member is conventionally provided with a multitude of cooling channels.

German Patent Publication DE 3,535,779 describes a thrust nozzle for a high performance propulsion plant, for example for carrier rockets or reusable spacecraft. The thrust nozzle has a contour of rotational symmetry providing a circular cross-section that tapers, starting from the combustion chamber, in the direction of the neck cross-section downstream of which the cross-section widens again. Such a contour of rotational symmetry is simple with regard to technical manufacturing considerations. Such contour also makes possible an effective take up of the gas forces.

Due to the high temperatures of about 3000° C., however, the thrust nozzle must be effectively cooled. The known thrust nozzle comprises an inner jacket made of a copper alloy. The copper alloy inner jacket is cooled with the help of cooling channels extending either circumferentially or axially in the inner jacket or inner wall member. A cooling medium flows through these channels, for example liquid hydrogen to be used as fuel in the thrust nozzle after it has served as a coolant. The inner jacket is outwardly surrounded by a support jacket in a jointless manner. The support jacket takes up the gas pressure forces. The support jacket must have a high tension strength while its heat resistance is of lesser importance due to the inwardly arranged cooling.

Efforts have been made in the development of hypersonic aircraft equipped with such a thrust nozzle or nozzles. These thrust nozzles must generate thrust with a high efficiency, whereby several propulsion plants are to be arranged alongside one another. For achieving these requirements, it has been suggested that the cross-sectional contour of these nozzles transits from a circular cross-section in the area of the combustion chamber to a rectangular cross-section in the area of the nozzle exit or even already in the area of the nozzle neck.

Such a contour requires that the nozzle wall assumes a complicated curved configuration or shape. On the one hand the relatively soft inner jacket or inner wall member must have a precisely conforming inner contour in order to assure an optimal throughflow. On the other hand, the outer support jacket must, due to strength considerations, have such a configuration retaining stiffness that a conforming to the configuration of the inner jacket is not possible. However, the production of both jackets with such a high configuration accuracy is very expensive due to manufacturing considerations taking the complicated geometry into account.

A further disadvantage is to be seen in that after the joining of the inner and outer jacket, hollow spaces possibly remain between the jackets. In operation, these hollow spaces may lead to deformations and fractures and thus resulting in a reject.

It is known from German Patent Publication DE 4,015,204 to equip a thrust nozzle with an inner jacket made of a material having a high heat conductivity and provided with a number of cooling channels in order to avoid the above mentioned disadvantages. The inner jacket is surrounded outwardly by a rigid support jacket. An intermediate layer is cast between the inner jacket and the support jacket. The purpose of the intermediate layer is to compensate for manufacturing tolerances of the inner jacket and the support jacket so that the requirements regarding shape accuracies of both jackets can be reduced.

German Patent Publication DE 4,115,403 discloses a nozzle wall for expansion ramps and hot gas nozzles which comprise an outer support structure away from the hot gas and a multilayer inner structure provided with cooling channels spaced from one another and extending to face the hot gas. Nozzles of such a construction are suitable for achieving a high thrust and a simple switchability between the types of propulsion plants, particularly if these nozzles have a rectangular construction. However, nozzle walls of such thrust nozzles are exposed to high pressure forces and temperatures. Contrary to walls of nozzles with circular cross-section, the pressure forces effective on plane nozzle walls of rectangular nozzles or combustion chambers cause high bending moments. Thus, warping or undesirable stress distributions may occur in the rectangular thrust nozzle, whereby the intended function of the thrust nozzle is jeopardized. Additionally, the so-called bi-metal effect has an aggravating influence due to the temperature differences within the multilayered wall. Thus, dimensionally stable cooled walls are required in order to avoid thrust losses and leakage currents.

In view of the above the known nozzle wall comprises an internal structure including a heat conducting layer in contact with the hot gas and a heat resistant sliding layer, whereby the cooling channels are embedded in the heat conducting layer. The heat conducting layer is elastically connected with the support structure by a plurality of holding elements penetrating the sliding layer. As a result, the sliding layer can be made of granular ceramic material while the heat conducting layer is made of copper.

The holding elements may be constructed in the shape of small tubes, whereby however, the available expansion length is insufficient, due to the required minimal stiffness of these small tubes, when the thrust nozzle is exposed to the extreme thermal loads that are usual in high performance propulsion plants, due to the high induced thermal stresses accompanied by substantial plastic strains whereby the useful life is substantially reduced.

The above useful life limitation is due to a failure, such as a fracture, in the combustion chamber wall after a limited number of load cycles causing a respective plastic deformation and creep due to the restrained thermal strains or expansions that are caused by secondary stresses resulting from the high thermally induced stresses amounting to about 80% of the entire load.

The foregoing drawbacks not only limit the reusability, but also increase the total costs of the conventional carrier system. Fracture formations cause impulse losses and excessive loads on the propulsion plant components including known turbo pumps during the operation of the propulsion plant.

Even if other materials for the intermediate layer between the hot gas exposed wall and the outer structure are used, such as sintered aluminum or foamed aluminum materials which can take up high deformations, irreversible deformations in the plastic range occur so that these characteristics lead to the single use concept.

Known materials for use in the support elements between the hot gas exposed wall and the outer support structure surrounding the gas exposed wall are supposed to provide a defined yielding by cross-expansion during operation of the high performance propulsion plant. However, these support elements do not have a sufficiently elastic expansion or strain characteristic.

OBJECTS OF THE INVENTION

In view of the foregoing it is an aim of the invention to achieve the following objects singly or in combination:

- to provide a wall structure for a combustion chamber of a high performance propulsion plant or for nozzles of flying bodies, which wall structure has a substantially increased useful life so that a high number of thermal cycles can be performed by the combustion chamber or nozzle while providing an improved reliability and an improved operability;
- to provide a wall structure that permits building elastic combustion chamber enclosures and nozzle enclosures; and
- to construct combustion chamber walls and nozzle walls in such a way that all types of deformations can be taken up without damage to the wall structure.

SUMMARY OF THE INVENTION

By employing a combustion chamber of the type described above, the above object has been achieved according to the invention in that an intermediate layer is arranged between the inner wall member and the outer pressure jacket, wherein the intermediate layer is made of a material having shape memory characteristics or superelastic characteristics.

The intermediate layer can be made of wires arranged in parallel to one another or of one band or tape or of several bands or tapes made of such shape memory or superelastic materials, or as an intermediate shell of such materials.

Materials having shape memory characteristics are also known under the term "memory metal" and include such alloys as NiTi, CuZnAl, and so forth. These alloys have a controllable super-elastic characteristic so that elastic combustion chamber structures can be realized. If slots are provided in the inner wall member of copper, which includes cooling channels, a substantial increase in the combustion chamber useful life can be achieved. This improvement is due to a partial control of the strain characteristic in areas subject to extreme loads, for example in the neck area of the nozzle by a controlled shape change of the intermediate layer of the wall structure of the invention.

The highly elastic shape change of the intermediate layer made of a material having shape memory characteristics and/or superelasticity makes possible a high utilization potential of the elastic characteristic of the combustion chamber structure. By using so-called cryogenic materials for the intermediate layer it is possible to operate at working temperatures in the cryogenic range, for example −100° C. so that these temperatures are preferably implemented near the temperature of the cooling channels that are cooled by hydrogen flowing through these channels.

The possibility of performing most varied shape changes such as elongation, shortening, bending, torsion, and so forth provide the advantage of a wide spectrum in the structural realization of nozzle or combustion chamber configurations, especially where very complex geometries are involved.

In addition to the high number of thermal cycles that a combustion chamber or nozzle according to the invention can perform, a high reliability of the reproducibility of the shape change is assured which in turn results in a highly reliable operability of the entire system.

BRIEF DESCRIPTION OF THE DRAWINGS

In order that the invention may be clearly understood it will now be described in connection with example embodiments, with reference to the accompanying drawings, wherein:

FIG. 1 shows a wall portion of a combustion chamber for a high performance propulsion plant or for a nozzle of a rocket in the switched off phase and under normal conditions;

FIG. 2 shows the wall portion of FIG. 1 during the starting phase and in a steady operational state;

FIG. 3 shows a modified wall portion of a combustion chamber in the switched off phase and under normal operating conditions; and FIG. 4 shows the wall portion of FIG. 3 in the starting phase and in a steady operational state.

DETAILED DESCRIPTION OF PREFERRED EXAMPLE EMBODIMENTS AND OF THE BEST MODE OF THE INVENTION

FIG. 1 shows a portion of a wall structure for a combustion chamber or nozzle. The wall structure has an outer pressure jacket 9 and an inner wall member 10. An underside 7 of the inner wall member 10 is exposed to hot gases. The inner wall member 10 is provided with a multitude of cooling channels 11 arranged in parallel to one another. A partial expansion space 1 is provided between the outer pressure jacket 9 and the inner wall member 10. An intermediate layer 2 is arranged in the expansion space 1. The intermediate layer 2 is made according to the invention of a material having shape memory characteristics and/or superelastic characteristics, for example a memory metal or alloy.

The intermediate layer 2 in the embodiment of FIGS. 1 and 2 is preferably made of a multitude of wires arranged in parallel to and next to one another. Each wire is made of shape memory or superelastic material. FIG. 1 illustrates the switched off phase under normal conditions, wherein the intermediate layer 2 is exposed to a tension force as indicated by the three arrows pointing left on the left side of FIG. 1. During the starting phase and in a steady flying state as shown in FIG. 2, the force direction is reversed because as indicated by the three arrows now pointing to the right, the intermediate layer has changed its shape and therefore is now provided with reference number 5. This change in shape is due to the fact that the transition temperature of the intermediate layer shape memory or superelastic material has been exceeded.

FIG. 1 also shows expansion slots 3 which widen upwardly in the direction toward the shape changed intermediate layer 5 as shown in FIG. 2 illustrating the steady state operation.

In the embodiment of FIGS. 3 and 4, the intermediate layer 4 is shown in FIG. 3 prior to a shape change. FIG. 4 shows an intermediate layer 8 after a shape change. The layer 4 is made of one band or belt of shape memory or superelastic material or of several bands or belts of shape memory or superelastic material arranged next to each other or of a shell of such material which substantially covers the entire contact area between the outer pressure jacket 9 and the inner wall member 10.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A wall construction for a combustion chamber of a high performance propulsion plant or for a nozzle of flying bodies, said wall construction comprising an outer load supporting pressure jacket and an inner wall member for contacting hot gases, said outer jacket surrounding said inner wall member, a plurality of cooling channels in said inner wall member for cooling said combustion chamber, said wall construction further comprising an intermediate layer (2, 5, 4, 8) positioned between said inner wall member (10) and said outer load supporting pressure jacket, said intermediate layer being made of a material having at least one characteristic of shape memory characteristics and superelastic characteristics for providing said combustion chamber or nozzle with said intermediate layer having at least one of said characteristics.

2. The wall construction of claim 1, wherein said intermediate layer comprises wires arranged in parallel to one another, each of said wires being made of said material having at least one characteristic of shape memory characteristics and superelastic characteristics.

3. The wall construction of claim 1, wherein said intermediate layer comprises at least one of a single band, several bands arranged next to each other, and a shell surrounding said inner wall member (10).

4. The wall construction of claim 1, further comprising expansion slots (3) provided in said inner wall member (10) between said cooling channels (11), said expansion slots (3) extending perpendicularly to said intermediate layer (2, 5; 4, 8) and through a portion of a thickness of said inner wall (10).

5. A combustion chamber of a high performance propulsion plant comprising said wall construction of claim 1.

6. A nozzle of a high performance propulsion plant comprising said wall construction of claim 1.

7. The wall construction of claim 4, wherein said expansion slots (3) widen toward said intermediate layer in operation.

* * * * *